Nov. 1, 1938.  E. G. SCHARTOW  2,134,844
DAMPER AND DAMPER CLIP CONSTRUCTION
Filed July 28, 1937
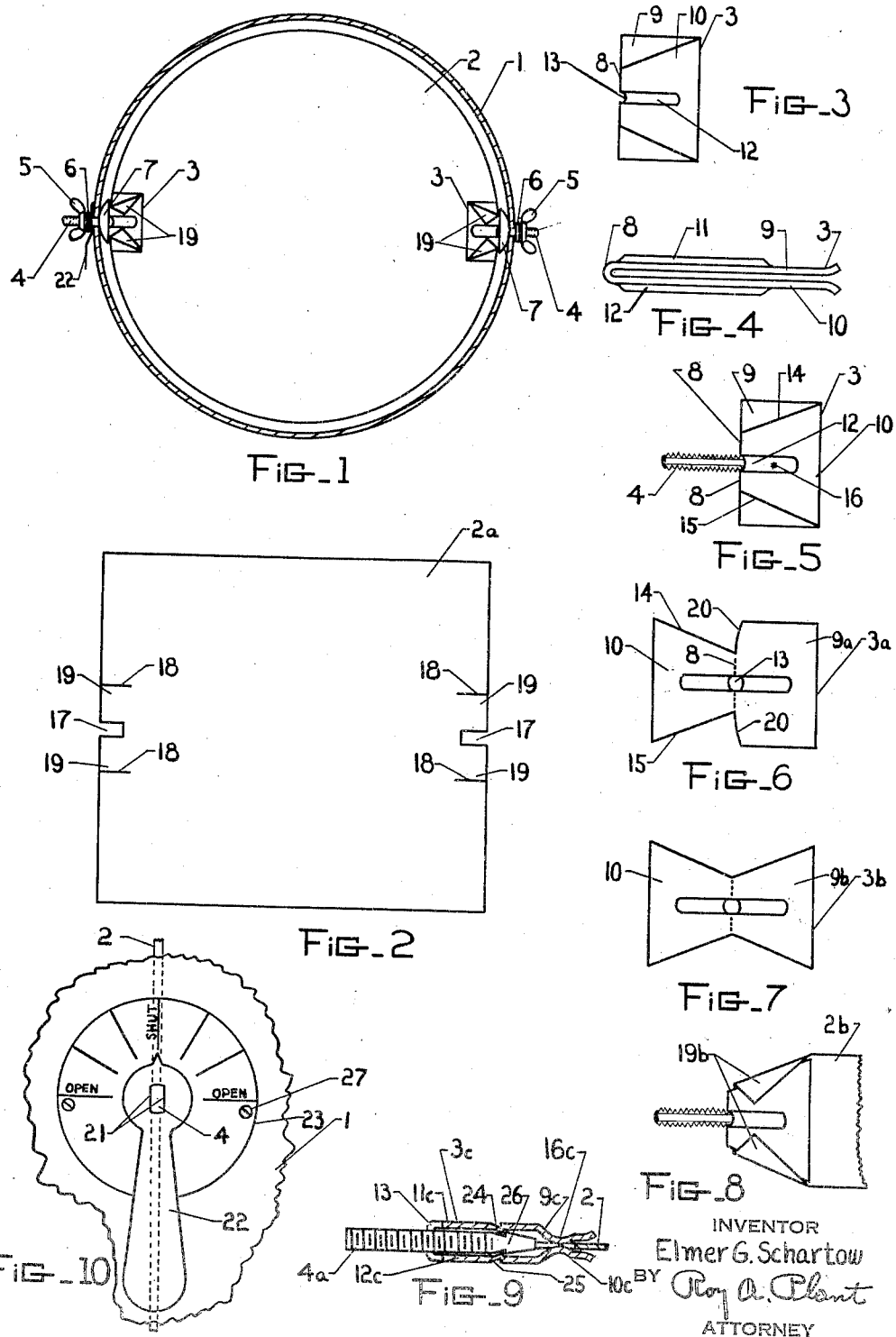
INVENTOR
Elmer G. Schartow
BY Roy A. Plant
ATTORNEY Patented Nov. 1, 1938

2,134,844

UNITED STATES PATENT OFFICE 2,134,844

DAMPER AND DAMPER-CLIP CONSTRUCTION

Elmer G. Schartow, Midland, Mich.

Application July 28, 1937, Serial No. 156,108

14 Claims. (Cl. 126—292)

The present invention relates to dampers for the control of air or other gaseous fluid, either hot or cold, in ducts, and more particularly to dampers having a special mounting member on opposite edges to permit rotation thereof.

In the past, it has been common practice to use dampers mounted on a sharp pointed rod which passes completely through a duct, such as a stove smoke-pipe. To avoid this cumbersome and costly construction, several attempts have been made to produce dampers with a pivot mounting on one edge only. These dampers have not proven satisfactory, since they are not only unstable, but lack adequate support for the damper blade to permit it to satisfactorily stand the passage of high velocity gases through the duct. The present invention has been devised to substantially overcome these and other shortcomings of the damper art.

Acccordingly, among the objects of the present invention is the provision of a rivetless and antirattle damper which has a simple means for clamping same in place.

Another object of the invention is to provide a damper clip which may be of several different forms and which is adapted to be used on both edges of the damper.

Another object is to provide a damper handle with opening adapted to slip over the damper clip pivot member which is preferably threaded and flattened at two sides. The hole in the handle is preferably so placed that when the handle is installed, it will always lie in the plane of the damper blade.

Another object is to provide a damper clip adapted for use on various shaped damper blades.

A further object is to provide a means for gripping the damper blade to the side of the duct at the pivot points.

A further object is to provide damper clips adapted to be fastened to the damper blade by means of bent tongues on the blade.

A further object is to provide a damper combination which eliminates the riveting or screw fastening of a handle mounting device on the duct.

A further object is to provide a damper combination which permits the utilization of sheet metal for the damper blade and the blanks for the damper clips.

A still further object is to provide a damper mechanism which is simple in construction, inexpensive to manufacture, eliminates the necessity of punching holes in damper clips and damper blade, and also eliminates rivets and riveting.

Further objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In said annexed drawing:

Figure 1 is a section through a circular duct showing a typical damper assembly constructed according to one form of the present invention.

Figure 2 shows a rectangular damper blade notched and slit for the reception of the damper clips of the present invention.

Figure 3 is a side view of one form of the damper clip in its folded position.

Figure 4 is an enlarged top edge view of the damper clip shown in Figure 3.

Figure 5 shows the damper clip of Figures 3 and 4 with the threaded pivot member in place.

Figure 6 shows a modified form of the damper clip blank before folding.

Figure 7 shows another modified form of damper clip blank.

Figure 8 shows a damper blade end assembly utilizing the damper clip of Figure 7 after mounting same and folding the tongues of the damper blade.

Figure 9 is a sectional edge view of a modified damper clip having a pivot member with barbed end.

Figure 10 is a fragmentary side view of a duct which has a damper indicator plate and damper handle thereon, the winged nut for fastening the handle on the flat sided damper pivot member being omitted.

Referring more particularly to the drawing, Figure 1 shows a duct 1 having therein a damper blade 2, and damper clips 3 on opposite edges thereof. The damper clips 3 are preferably provided with flat sided threaded pivot members 4 having tightening means thereon, such as wing nuts 5. Where the pivot member 4 is made flat sided, it facilitates the use of a handle for rotating the damper, however, the invention is not limited to the use of such flat sided pivot members, though it is preferable to use one, or its equivalent, for convenience of operating the damper. A lock washer 6 may be used under each of the wing nuts if desired to produce antirattle tension on the damper even when the wing nuts 5 are not completely tight. A concave disc member 7 may be used on each of the pivot members 4. The disc member 7 is preferably used between the damper blade and inner face of the duct in case of a circular duct, and on the outside of the duct in case of a rectangular duct. In either position it produces a spring-like tension when the wing nuts 5 are tightened and aids in preventing damper rattles.

As shown in Figures 3 and 4, the damper clip 3 in one preferred construction consists of a piece of sheet metal bent double about its mid-point 8 so as to produce two side members 9 and 10 parallel to each other, but spaced apart sufficiently to permit the insertion of a damper blade 2 therebetween. At substantially the center of side members 9 and 10 are pressed ridges 11 and 12 with an opening 13 at the end thereof for the insertion of a pivot member 4 which is preferably in the form of a flat sided threaded rod which may be fastened therein in conventional manner, for instance, by spot welding 16. One of the side members, for instance 10, is preferably provided with notched or cut-away edges 14 and 15, the use of which will be hereinafter explained.

Where a blade such as circular damper blade 2 or rectangular damper blade 2a is to be used with damper clips 3, the edge of the blade is prepared for use as shown in Figure 2. A notch 17 is cut at opposite edges of the damper blade 2a for the reception of the inner end of pivot member 4 between side members 9 and 10 of damper clip 3. It is thus to be seen that the assembled damper clip 3, shown in Figure 5, may be slipped onto the edge of damper blade 2a until the inner edge of its mid-point 8 contacts the outer edge of damper blade 2a, and the inner end of pivot member 4 rests in notch 17. Slits 18 are provided in the edges of the damper blade on opposite sides of notch 17. With the assembled damper clip 3 in place on the edge of damper blade 2a, tongues 19 are bent over notched edges 14 and 15 to lock damper clip 3 in place as shown in Figure 1. The provision of side member 10 with diagonally notched edges 14 and 15 thus permits tongues 19 of the damper blade, when bent as shown, to lock damper clip 3 against endwise removal and simultaneously bind same against rattling without rivets and the labor of punching and riveting incident thereto. Side member 9 in Figures 3 and 5 is shown to be full size and not notched back. Under these conditions, the full size side member 9 acts to seal the opening made by turning tongues 19 inward to lock the damper clip 3 in place.

Where the damper clip is to be used for mounting a damper blade in a curved or circular duct, a smooth job is had by rounding edges 20 of side member 9a of damper clip 3a, as shown in Figure 6. This damper clip 3a which is foldable at its mid-point 8, shown by a dotted line, is equally usable in ducts of other cross-sectional shapes except where an exceptionally tight fitting damper is required and the small amount of by-passing of gases, such as air flowing under pressure from a blower, which will take place at the edges 20, is undesirable.

A modified form of damper clip 3b is shown in Figure 7. Here side member 9b is cut to the same profile as side member 10. A damper assembly showing the use of this damper clip is illustrated in Figure 8. The corners 19b of the damper blade here are turned down leaving an open space at each corner of the damper which permits the by-passing of gaseous fluids passing through the duct. In case this by-passing is undesirable, then the assembled damper clip of Figure 5 may be used, side member 9 of which will substantially cover the opening formed by folding edges 19b of damper blade 2b.

Where a damper clip, such as is shown in Figure 5, is assembled, it is provided with ridges 11 and 12 (Figure 4) adapted to receive pivot member 4, which is preferably in the form of a threaded rod with flat sides 21 (Figure 10). The ridges 11 and 12 are preferably so formed that they will only receive the flat sided pivot member 4 with its flat sides in planes parallel to the planes of side members 9 and 10. Pivot member 4 may then be fastened in place to the clip 3 in any suitable manner, for instance by spot welding 16. The damper blade 2 with assembled damper clips in place may then be passed into the duct edgewise and by distorting the duct, pivot members 4 may be passed through suitable openings in the sides of the duct, as shown in Figure 1. A handle 22 (Figure 10) with a lengthwise opening adapted to receive the end of one pivot member 4 is then slipped over same. Lock washers 6, if desired, may be placed on pivot members 4 and then wing nuts 5 placed thereon and tightened to hold damper blade 2 in rattleless, fixed location. Where the handle is constructed as is shown in Figure 10 and mounted on pivot member 4 assembled in clip 3 as shown in Figure 5, the handle 22 will always be in line with the edge of damper blade 2. As an additional aid in determining the exact setting of the damper, the duct 1 may be provided with a plate 23, fastened thereto in conventional manner, to indicate the open and shut positions of the damper.

Where the duct in which the damper is to be installed is of a relatively rigid construction, or the like, which would make difficult the distorting of same to receive pivot members 4 of the damper 2, a modified form of damper clip and pivot member may be used. Such modified damper clip and pivot may be of many equivalent forms, and preferably so assemblable that the pivot may be inserted after the damper blade is in place in the duct. The assembly normally should be tightenable so as to prevent rattling of the damper in use. One such construction is shown in Figure 9 wherein the pivot member 4a, which is preferably flat sided and threaded, is provided with a barbed end 26, and channels 11c and 12c of sides 9c and 10c of the clip are provided with inwardly directed projections 24 and 25. The barb 26 and projections 24 and 25 may be of various shapes, but for most purposes a sharp edged barb and projections are preferable, since this construction is exceptionally effective in preventing the pulling out of pivot member 4a under conditions of use. With this construction, damper clip 3c may be mounted on damper blade 2 and fastened in place, for instance, as described above. The damper blade 2 may then be passed into the duct and pivot member 4a slipped through the pivot opening in the side of the duct from the outside into opening 13 of the end of damper clip 3c, whereupon by forcing its barbed end past projections 24 and 25 into catching relation, the pivot member 4a will be locked against return movement. If desired, the clip 3c may have its free edges fastened together, for instance by spot welding 16c, to prevent spreading and unlatching after pivot 4a has been driven into place. This type of clip may be used on one or both edges of the damper blade 2 if desired.

Other modes of applying the principle of my invention may be employed instead of those explained, change being made as regards the article herein disclosed, provided the means stated by any of the following claims or the equivalent of such stated means be employed.

I therefore particularly point out and distinctly claim as my invention:

1. In a damper of the character described, the combination which comprises a damper blade, two damper clips, said damper clips being placed on opposite edges of said damper blade, means for fastening said damper clips to said damper blade, and a threaded flat sided pivot member projecting from at least one of said clips.

2. In a damper of the character described, the combination which comprises a damper blade, two damper clips, said damper clips being placed on opposite edges of said damper blade, rivetless means for fastening said damper clips to said damper blade, threaded pivot members projecting from each of said clips, at least one of said pivot members being flat sided, and a handle engaging said flat sided pivot member.

3. In a damper of the character described, the combination which comprises a damper blade, two damper clips, said damper clips being placed on opposite edges of said damper blade, rivetless means for fastening said damper clips to said damper blade, threaded pivot members projecting from each of said clips, at least one of said pivot members being flat sided, a handle engaging said flat sided pivot member, and means threadedly engaging each of said pivot members and adapted for clamping the damper blade in place when installed in a suitable duct.

4. A damper blade which comprises a suitable shaped piece of sheet metal having a notch at its opposite sides on the pivoting axis, and a slit in said sheet metal member at each side of each notch, said slits being spaced an approximately identical short distance from each of said notches to form tongue ends which may be bent.

5. A damper clip of the character described, which comprises a strip of metal folded so as to form two spaced apart parallel side members having an opening through said fold, an outwardly directed channel in each of said side members and extending perpendicular to the folded edge starting with the opening therein, and a pivot member one end of which is adapted to pass through the opening in the fold edge of the clip and be fastened in said channel.

6. A damper clip which comprises a strip of metal foldable so as to form two spaced apart parallel side members having an opening through said fold, an outwardly directed channel for the reception of a pivot member between said side members, said channel extending from the opening in the folded edge of said side members and terminating short of the edge opposite said fold, and a pivot member, one end of which is adapted to pass through the opening in the fold edge of the clip and be fastened in said channel.

7. A damper clip which comprises a strip of metal foldable so as to form two spaced apart parallel side members having an opening through said fold, an outwardly directed channel for the reception of a pivot member between said side members, said channel extending from the opening in the folded edge of said side members, at least one of the aforementioned side members being cut so as to be narrower at the fold edge than at the edge opposite thereto, and a pivot member, one end of which is adapted to pass through the opening in the fold edge of the clip and be fastened in said channel.

8. A damper clip which comprises a strip of metal foldable so as to form two spaced apart parallel side members having an opening through said fold, an outwardly directed channel in each of said side members coinciding with the pivot axis thereof and starting with the opening in the folded edge of said side members, a threaded pivot member, one end of which is adapted to pass through the opening in the fold edge of the clip and extend into said channels, and means for anchoring said pivot member in said channel.

9. A damper clip of the character described, which comprises a strip of metal folded so as to form two spaced apart parallel side members having an opening through said fold, an outwardly directed channel in each of said side members and extending perpendicular to the folded edge starting with the opening therein, at least one of the aforementioned side members being cut so as to be narrower at the fold edge than at the edge opposite thereto, and a pivot member one end of which is adapted to pass through the opening in the fold edge of the clip and be fastened in said channel.

10. A damper clip of the character described, which comprises a strip of metal folded so as to form two spaced apart parallel side members having an opening approximately centrally located on said fold, an outwardly directed channel in each of said side members and extending perpendicular to the folded edge starting with the opening therein, at least one of the aforementioned side members being cut so as to be narrower at the fold edge than at the edge opposite thereto, a pivot member one end of which is adapted to pass through the opening in the fold edge of the clip and be fastened in said channel, and means for fastening the pivot member in said channel.

11. A damper clip of the character described which comprises a strip of metal folded so as to form two spaced apart parallel side members having an opening through said fold, an outwardly directed channel in each of said side members and extending from the folded edge starting with the opening therein, said channels in the side members being parallel and side by side, a threaded pivot member which is adapted to pass through the opening in the fold edge of the clip and extend into said channels, and means in connection with the channels of said clip adapted to engage said pivot member and mechanically hold same in place.

12. A damper clip of the character described, which comprises a strip of metal folded so as to form two spaced apart parallel side members having an opening through said fold, an outwardly directed channel in each of said side members and extending perpendicular to the folded edge starting with the opening therein, an inwardly directed projection in each of said channels, and a pivot member having a barbed end which is adapted to pass through the opening in the fold edge of the clip and engage for fastening purposes with said inwardly directed projections in said channels.

13. In a damper of the character described, the combination which comprises a damper blade having two notches, said notches being placed opposite each other on opposite edges of the damper blade, a slit at each side of each notch, said slits being symmetrically and identically located to each of said notches, but spaced an identical short distance therefrom; damper clips for mounting on two opposite edges of the damper, each of said clips comprising a strip of metal folded so as to form two spaced apart parallel side members having an opening approximately centrally located on said fold, an outwardly directed channel on each of said side members and extending perpendicular to the folded edge starting with the opening therein, at least one of the aforementioned side members being cut so as to be narrower at the fold edge than at the edge opposite thereto; tongue means for locking said clips to the edge of said damper blade, said tongues being part of the damper blade and each starting with one of said slits; a separate pivot member for each of said clips, one end of a pivot member being adapted to pass through the opening in the fold edge of the clip and to be fastened in said channels, means for fastening the pivot member in said channels; a control handle adapted for mounting on at least one of said pivot members, and means on each of said pivot members adapted to engage same in an endwise tightening direction.

14. In a damper of the character described, the combination which consists of a damper blade having two notches, said notches being placed opposite each other on the pivot line of the damper at opposite edges of the damper blade, a slit at each side of each notch, said slits being symmetrically and identically located to each of said notches but spaced a substantially identical short distance therefrom; damper clips for mounting on two opposite edges of the damper, each of said clips consisting of a strip of metal folded so as to form two spaced apart parallel side members having an opening approximately centrally located on said fold, an outwardly directed channel on each of said side members and extending perpendicular to the folded edge starting with the opening therein, at least one of the aforementioned side members being cut so as to be narrower at the fold edge than at the edge opposite thereto; tongue means for locking said clips to the edge of said damper blade, said tongues being part of the damper blade and each starting with one of said slits, said tongues being adapted to be bent over the edges of the damper clip on the side which is narrower at the fold edge than at the edge opposite thereto; a threaded separate pivot member for each of said clips, at least one of said pivot members being flat sided, one end of a pivot member being adapted to pass through the opening in the fold edge of the clip and to be fastened in said channels, means for fastening the pivot member in said channel; a control handle adapted for mounting on the flat sided pivot member, and wing nuts for threadedly engaging said pivot members and adapted for gripping the damper assembly in an endwise tightening direction in a suitable duct.

ELMER G. SCHARTOW.